United States Patent [19]
Atos et al.

[11] Patent Number: 5,544,417
[45] Date of Patent: Aug. 13, 1996

[54] MULTI-PURPOSE MOTOR MOUNTING SYSTEM FOR A STRING TRIMMER

[75] Inventors: Sheldon Atos, Mallorytown; Jacob Prosper, Brockville, both of Canada

[73] Assignee: Black & Decker Inc., Newark, Del.

[21] Appl. No.: 326,729

[22] Filed: Oct. 20, 1994

[51] Int. Cl.$^6$ .................................................. B26B 25/00
[52] U.S. Cl. ................................................. 30/276; 29/469
[58] Field of Search .......................... 30/276, 200, 210, 30/206, 216, 220, 228; 56/12.7; 29/469, 525.11

[56] References Cited

U.S. PATENT DOCUMENTS

| | | | |
|---|---|---|---|
| 3,831,278 | 8/1974 | Voglesonger | 30/276 |
| 4,052,789 | 10/1977 | Ballas, Sr. | 30/276 |
| 4,156,312 | 5/1979 | Ballas, Sr. | 30/276 |
| 4,161,820 | 7/1979 | Moore | 30/276 |
| 4,162,575 | 7/1979 | Ballas | 30/347 |
| 4,167,812 | 9/1979 | Moore | 30/276 |
| 4,168,572 | 9/1979 | Ewing | 30/276 |
| 4,172,322 | 10/1979 | Ballas | 30/276 |
| 4,177,561 | 12/1979 | Ballas | 30/276 |
| 4,183,138 | 1/1980 | Mitchell et al. | 30/276 |
| 4,189,833 | 2/1980 | Kwater | 30/276 |
| 4,236,311 | 12/1980 | Mitchell | 30/276 |
| 4,245,454 | 1/1981 | Zien | 30/276 |
| 4,249,310 | 2/1981 | Secoura et al. | 30/276 |
| 4,269,372 | 5/1981 | Kwater . | |
| 4,274,201 | 6/1981 | Oberg et al. | 30/276 |
| 4,483,069 | 11/1984 | Moore | 30/276 |
| 4,498,237 | 2/1985 | Mack et al. | 30/200 |
| 4,625,501 | 12/1986 | Baba | 30/276 X |
| 4,794,695 | 1/1989 | Hurst | 30/276 |
| 4,823,465 | 4/1989 | Collins | 30/276 |
| 4,860,451 | 8/1989 | Pilatowicz et al. | 30/276 |
| 5,020,223 | 6/1991 | Desent et al. | 30/276 |

OTHER PUBLICATIONS

Heil–Coil Division, Emhart Fastening Systems Group, Dodge® post molded screw thread inserts from Heli–Coil, Designer's Manual D300, MITE Corporation 1984.

*Primary Examiner*—Hwei-Siu Payer
*Attorney, Agent, or Firm*—Harness, Dickey & Pierce, P.L.C.

[57] ABSTRACT

A motor mounting plate system enables a motor to be mounted within a string trimmer without the need for a plurality of precisely formed ribs to support the motor within the housing. The motor mounting plate apparatus includes a planar mounting plate member and a U-shaped bracket member which are secured together to form a rigid motor mounting assembly. The U-shaped bracket member is connected to the stator of the motor of the string trimmer. A lower portion of the housing includes two housing halves, each including a groove formed therein. The outer perimeter of the motor mounting plate is positioned in the groove of one of the housing halves during assembly to support the motor within the housing half without the need for the motor to rest on a rib or any other protruding portion of the interior of the housing. The remaining housing half is then secured to the first mentioned housing half such that the motor mounting plate is secured substantially around its entire periphery within the groove formed in each housing half. A bushing insert is included for achieving a tight interference fit between the smooth armature shaft of the motor and a plastic fan member. The motor mounting assembly also serves to absorb the force of the "bump" when the operator bumps the line spool of the trimmer against the ground to advance the cutting line.

20 Claims, 3 Drawing Sheets

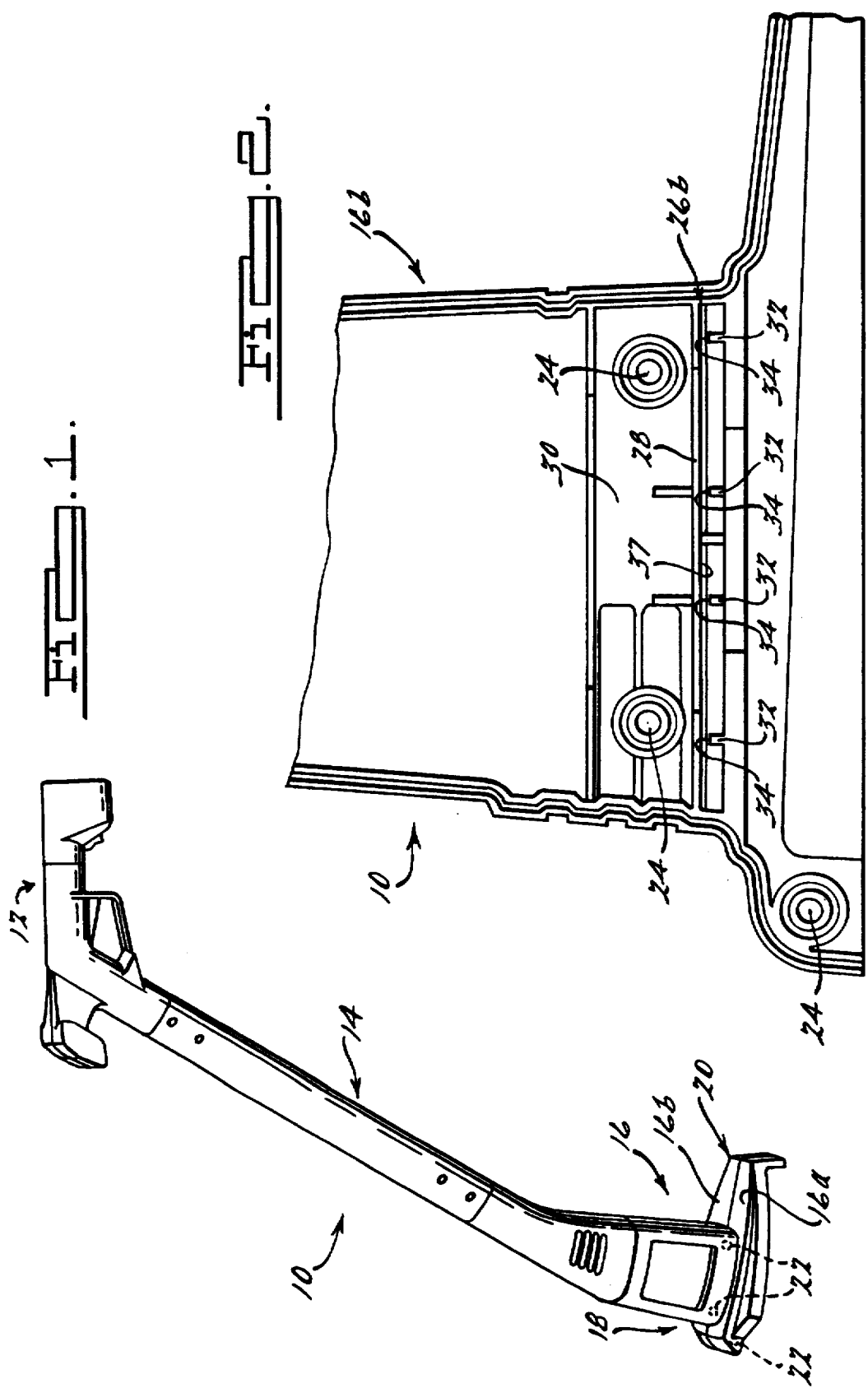

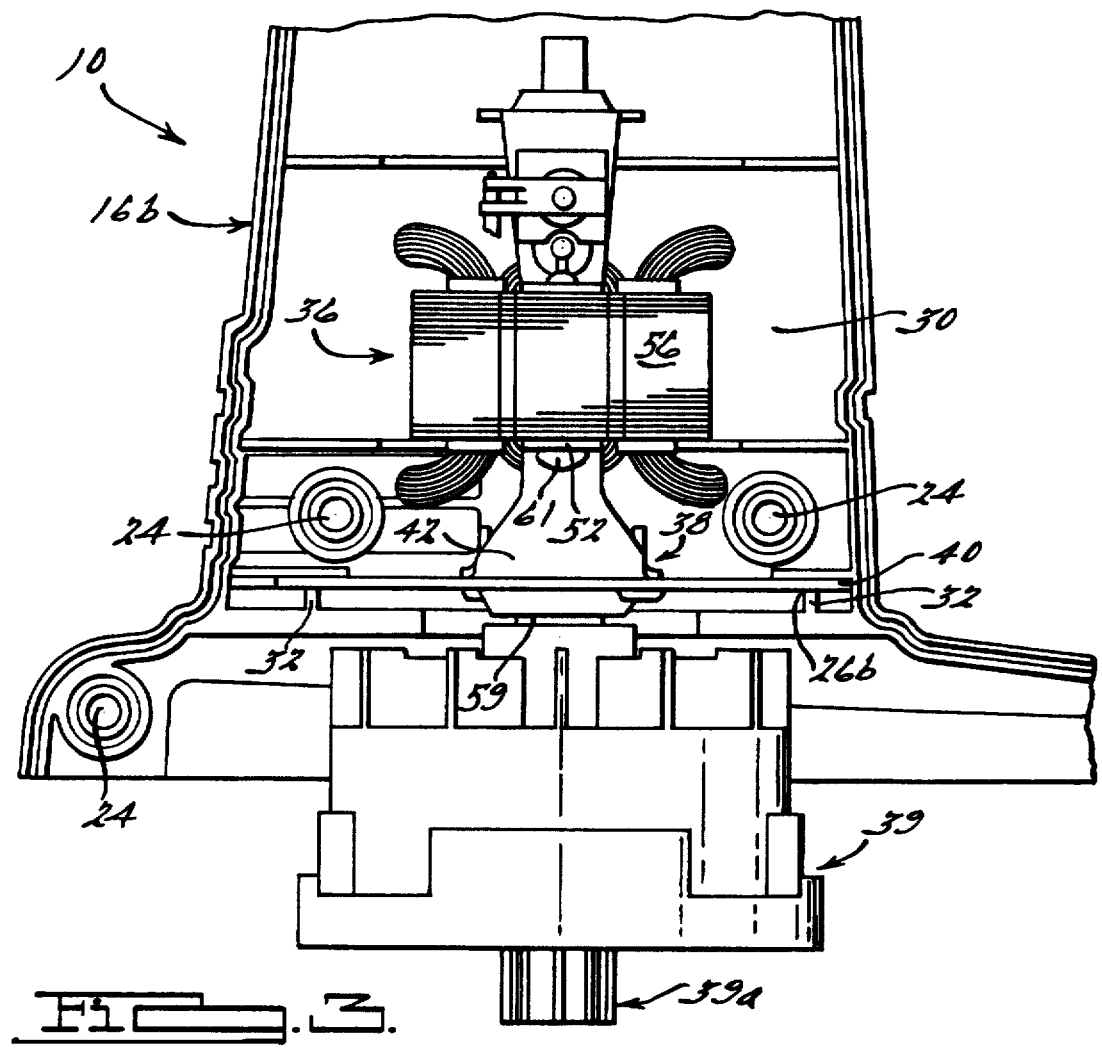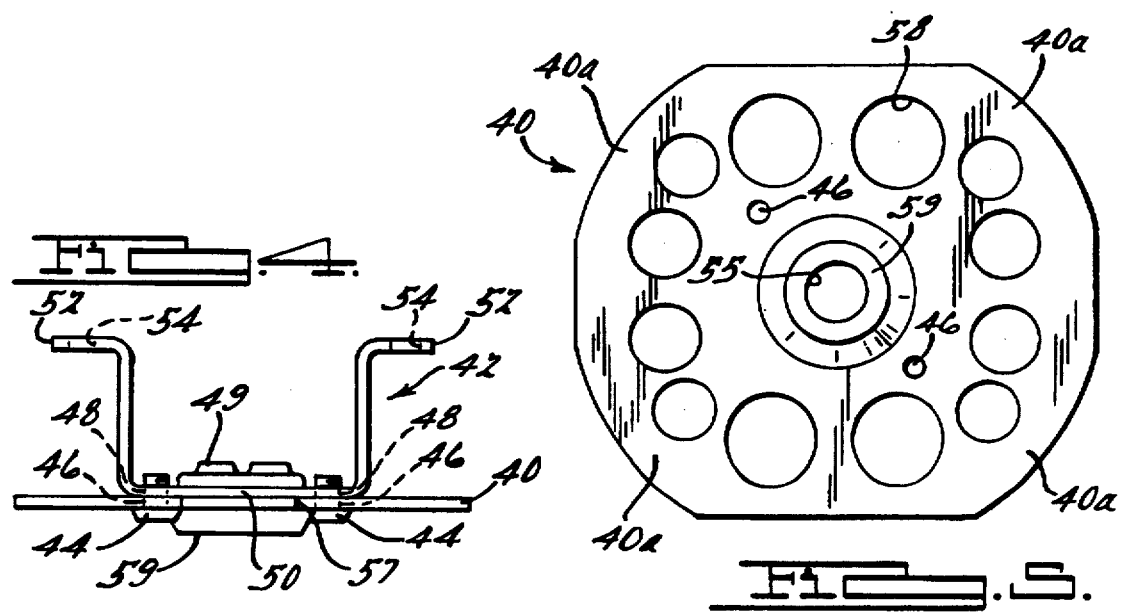

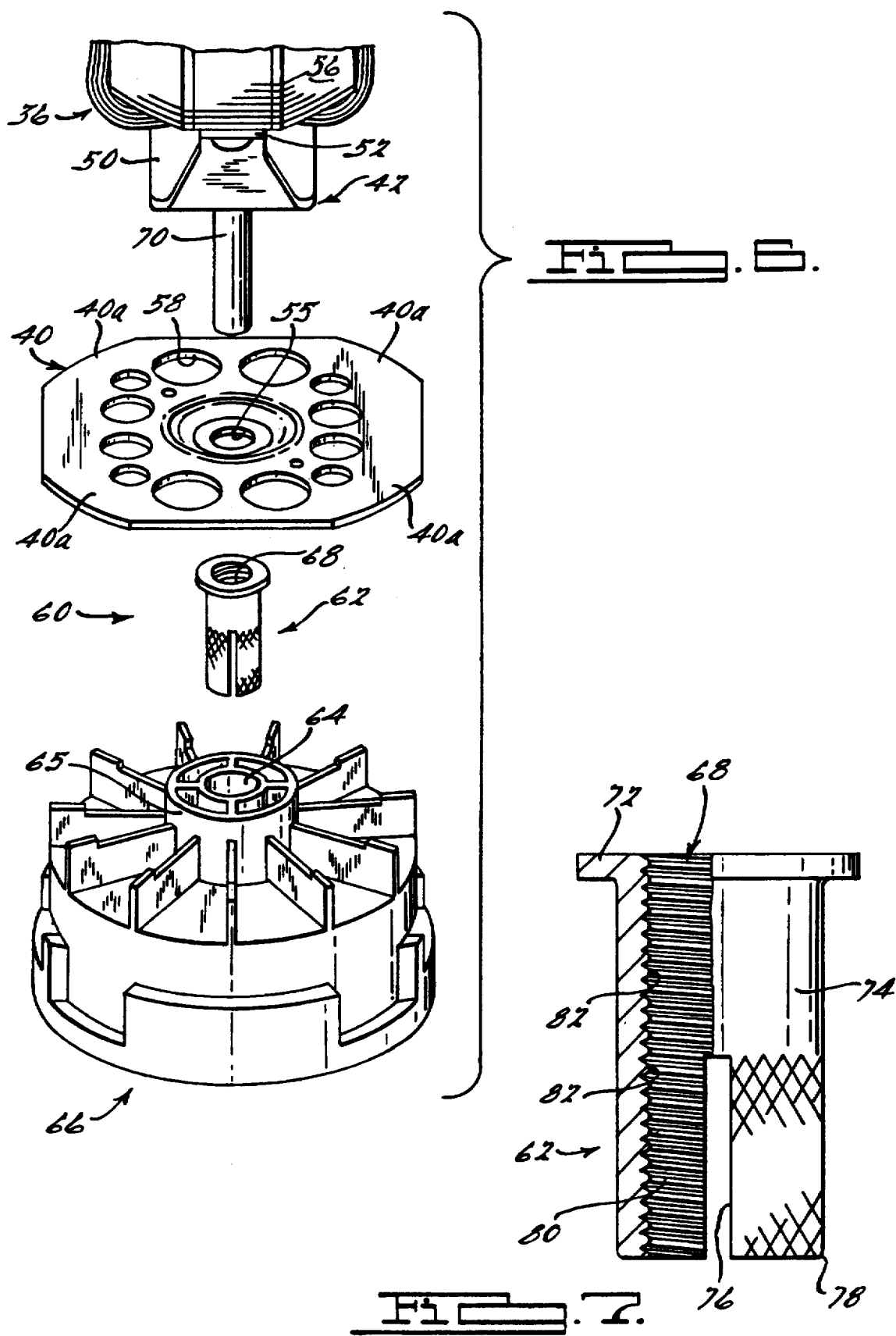

MULTI-PURPOSE MOTOR MOUNTING SYSTEM FOR A STRING TRIMMER

CROSS-REFERENCE TO RELATED APPLICATIONS

The subject matter of the present application is related to U.S. Patent application Ser. No. 29/030,023, filed Oct. 20, 1994, and entitled "Design: String Trimmer", assigned to the assignee of the present application;

U.S. Patent application Ser. No. 08/326,230, filed Oct. 20, 1994, and entitled "Mounting Arrangement For A Line Cut-Off Blade For A String Trimmer", assigned to the assignee of the present application; and U.S. Patent application Ser. No. 08/326,827, filed Oct. 20, 1994, and entitled "String Trimmer Having Knock-Down Handle", assigned to the assignee of the present application.

BACKGROUND OF THE INVENTION

1. Technical Field

This invention relates to apparatus for cutting vegetation, and more particularly to a vegetation cutter in the form of a string trimmer having an internally disposed motor which is supported by a motor mounting plate within a housing of the string trimmer without the need for a plurality of ribs to be formed on interior surfaces of the housing of the string trimmer.

2. Discussion

String trimmers are used in a wide variety of applications to trim vegetation such as grass, weeds, etc. in areas closely adjacent walls, fences and other structure where lawn mowers and other similar vegetation cutters have difficulty or are unable to access sufficiently to perform the needed cutting. Such string trimmers typically include a flexible cutting member in the form of a flexible plastic line which is mounted upon some form of a holding spool. The holding spool is typically coupled to an armature of a motor which is mounted within a lower housing portion of the string trimmer.

With many conventional string trimmers the motor is positioned within a housing by one or more protruding ribs which are integrally formed on interior surfaces of the housing. The housing is also typically constructed in two halves. During assembly the motor is placed on one or more of the protruding ribs of one of the housing halves and the other housing half secured to the first housing half to encapsulate the motor therein such that the motor is supported and held stationary within the housing halves by abutting contact with the ribs.

While the above-described mounting arrangement operates satisfactorily to support a motor within a housing of a string trimmer, this mounting arrangement does require relatively precisely-positioned ribs on the interior surfaces of the housing halves. These ribs somewhat complicate the construction of the two housing halves, which are typically molded from plastic and requires more complex and expensive molds or dies for producing the two housing halves. Additionally, if the ribs are not relatively precisely positioned or of a relatively precise height, then the motor may be able to wobble or otherwise move or cause vibration during operation of the string trimmer. Still further, precisely formed and positioned ribs are often difficult to achieve when certain types of plastic are used to construct the housing. For example, it is usually at least slightly more difficult to precisely form the support ribs from polypropylene than from ABS plastic. It would be highly desirable, however, to be able to use polypropylene for the construction of the housing since it is less costly than ABS plastic.

Accordingly, it would be desirable to have a more simple, yet secure method for mounting a motor of a string trimmer within the string trimmer housing to ensure secure mounting of the motor regardless of minor variations in dimensional or positional tolerances of the interior surfaces of the housing.

In view of the above, it is a principal object of the present invention to provide an apparatus for enabling a motor to be mounted within a housing of a string trimmer in a quick, easy and efficient manner which ensures stable and precise positioning of the motor within a two-piece housing during assembly.

It is yet another object of the present invention to provide an apparatus for mounting the motor of a string trimmer within a housing of the string trimmer in a manner which reduces the overall cost of manufacture of the string trimmer, and further which reduces the complexity of the interior surfaces of the housing to thereby reduce the cost of manufacture of the housing and the overall cost of manufacture of the string trimmer.

SUMMARY OF THE INVENTION

The above and other objects are accomplished by a motor mounting apparatus for a string trimmer in accordance with a preferred embodiment of the present invention. The motor mounting apparatus comprises a mounting plate assembly which is secured to a portion of a motor of a string trimmer apparatus. The mounting plate assembly is dimensioned to be positioned within the interior of a pair of halves of a two-piece housing of the trimmer apparatus. The halves of the two-piece housing include grooves which are formed circumferentially about an interior of each housing half. During assembly, the mounting plate assembly is first secured to the motor and then a mounting plate member of the mounting plate assembly is positioned partially within the groove formed in a first one of the housing halves. The second one of the housing halves is then secured to the first housing half to encapsulate the motor within the assembled housing of the trimmer apparatus.

The mounting plate assembly of the present invention allows the motor to be freely supported within the housing halves of the trimmer apparatus housing, thus obviating the need to precisely position the motor over a plurality of outwardly protruding ribs formed on the interior surfaces of the housing halves. Since a plurality of precisely positioned and dimensioned ribs are not required to be formed on the interior of the housing halves, this significantly reduces the complexity and cost of manufacture of the housing. Moreover, the motor is even more positively held within the housing of the trimmer apparatus with an even less likelihood of unwanted vibration developing over the life of use of the trimmer apparatus.

In a preferred embodiment, the mounting plate member of the mounting plate assembly further includes a plurality of apertures formed therein and is constructed of metal. The metal construction of the mounting plate member enables it to act as a heat-sink for the motor while the apertures allow air from a fan secured to an output shaft (i.e., armature) of the motor to be drawn around the motor. Thus, the mounting plate assembly does not interfere with the airflow, but rather even more positively helps to cool the motor.

In a preferred embodiment of the present invention the motor mounting plate assembly includes a U-shaped bracket which is secured to a planar mounting plate member. The planar mounting plate member fits within grooves formed in the interior surfaces of the housing while the U-shaped bracket secures directly to the stator of the motor via conventional threaded screws. It will be appreciated then that the motor mounting plate does not require any external components such as threaded screws or the like to be secured to the interior surfaces of the housing of the trimmer apparatus. The motor mounting plate assembly and the grooves formed in the interior of the housing halves thus allow the motor to be quickly, efficiently and cost-effectively assembled within the housing halves in a manner which reduces the overall cost and manufacturing complexity of the trimmer, as well as to even more positively maintain the motor precisely positioned within the housing.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a string trimmer apparatus incorporating the motor mounting apparatus of the present invention;

FIG. 2 is a fragmentary side view of a first half of a housing of the trimmer apparatus of FIG. 1 showing the groove which is formed in the lower interior surface of each one of the housings halves of the trimmer apparatus;

FIG. 3 is a side view of the interior of a lower portion of the first housing half showing a motor of the trimmer apparatus and a mounting plate assembly in accordance with a preferred embodiment of the present invention supporting the motor within the groove formed in the first housing half;

FIG. 4 is a side view of the mounting plate assembly;

FIG. 5 is a plan view of the planar mounting plate member;

FIG. 6 is an exploded perspective view of an alternative preferred embodiment of the present invention incorporating a bushing insert for coupling the smooth armature shaft of the motor to a plastic fan member of the trimmer apparatus; and FIG. 7 is a broken-away side view of the bushing insert of FIG. 6 showing in even greater detail the construction of the internal threaded bore thereof.

DETAILED DESCRIPTION OF THE PREFERRED EMBODIMENTS

Referring to FIG. 1, there is shown a string trimmer apparatus 10 incorporating a motor mounting plate assembly in accordance with a preferred embodiment of the present invention. The trimmer apparatus 10 is generally used for trimming vegetation such as weeds and grass in areas closely adjacent walls, fences etc. where vegetation cutters such as lawn mowers are unable to cut. The trimmer apparatus 10 includes a handle portion 12, an intermediate or stem portion 14 and a base portion 16. The base portion 16 is preferably constructed having housing halves 16a and 16b which are assembled after the internal components of the trimmer apparatus 10 are positioned within the base portion 16 such that the housing halves 16a, 16b encapsulate the interior components of the trimmer apparatus. At a lowermost portion 18 of the base portion 16 is formed a guard 20. The guard 20 helps to shield a flexible trimming line which is driven rotationally in conventional fashion below the lowermost portion 18 of the trimmer apparatus 10 by the motor of the apparatus 10.

Referring now to FIG. 2, the interior of housing half 16b can be seen. It will be appreciated that the interior of each of the housing halves 16a and 16b are essentially identical in construction. The housing half 16a includes a plurality of bosses 22 (shown in phantom) protruding from an interior surface thereof which each include a bore. The bosses 22 are positioned to align with openings 24 in housing half 16b such that a plurality of conventional threaded screws may be inserted through the openings 24 in the housing half and threadably advanced into the bores during assembly to hold the housing halves securely together.

Housing half 16b further includes a groove 26b which is formed by a shoulder portion 28 protruding transversely of an interior wall 30 and a plurality of spaced apart, vertically protruding interior shoulder portions 32. Each of the vertical interior shoulder portions 32 has a height which presents an upper edge surface 34 at an approximate, predetermined distance from an undersurface 37 of the shoulder portion 28. The construction of the housing half 16a includes structure which is a mirror image of that formed by the shoulder portions 28 and 32 of the housing half 16b (with the exception of the presence of the bosses 22 which do not have openings formed completely therethrough). Thus, when the housing halves 16a and 16b are coupled together, a groove is formed virtually completely about the interior of the housing halves 16a and 16b with the groove in the housing half 16a mirroring the groove 26b shown in FIG. 2.

Referring now to FIG. 3, a motor 36 of the trimmer apparatus 10 is shown supported within the housing half 16b by a motor mounting plate assembly 38 in accordance with a preferred embodiment of the present invention. The motor 36 is also shown coupled to a well-known trimming line spool or head 39 operable to advance a new length of trimming line when a bottom portion 39a is "bumped" against the ground while the motor 36 is running. With specific reference to FIG. 4, the motor mounting plate assembly 38 includes a planar plate member 40 and a U-shaped bracket member 42. The plate member 40 is secured to the U-shaped bracket member 42 via a plurality of threaded screws 44 which extend through apertures 46 in the plate member 40 and threadably engage corresponding threaded apertures 48 in a base portion 50 of the U-shaped bracket member 42. With further reference to FIG. 4, the U-shaped bracket member 42 includes a pair of transversely extending arm portions 52 which each include an aperture 54. A threaded screw or the like is inserted through each aperture 54 and threadably advanced into aligned, threaded apertures (not shown) in a stator 56 of the motor 36 shown in FIG. 3. A conventional bearing end assembly 49 is secured by threaded screws (not visible in FIG. 4) to the base portion 50 to help support the armature shaft of the motor 36 in response to radial loads placed thereon during use of the trimmer apparatus.

With brief reference to FIG. 5, the mounting plate member 40 includes a centrally disposed aperture 55 which allows a portion of the armature output shaft of the motor 36 to protrude therethrough. With further reference to FIG. 4, the U-shaped bracket member 42 also includes a centrally disposed aperture 57 which enables the armature output shaft of the motor 36 to pass therethrough when the motor is assembled to the U-shaped bracket member.

With further reference to FIGS. 4 and 5, the mounting plate member 40 includes a raised thrust absorbing portion 59. The raised thrust absorbing portion 59 helps to absorb the thrust or shock of the impact produced when the trimming line spool 39 is bumped against the ground to advance a new length of trimming line, which force would otherwise be absorbed by the motor 36. This feature will be described further in connection with FIGS. 6 and 7. When assembled together, the motor mounting plate 40, the U-shaped bracket member 42 and motor 36 form a rigidly coupled assembly.

With further reference to FIG. 3, during assembly the motor 36 is secured to the U-shaped bracket member 42 via a pair of threaded screws 61 (only one being shown in FIG. 3). The entire assembly of the motor 36 and the motor mounting assembly 38 is then positioned within one of the housing halves 16a or 16b, in this instance housing half 16b, and a portion of the mounting plate 40 is inserted into the groove 26b. As mentioned earlier, the height of each of the vertically protruding interior shoulder portions 32 is such that the groove 26b has an approximate predetermined height which allows edge portions 40a (indicated in FIG. 5) about the perimeter of approximately one-half of the mounting plate member 40 to be inserted therein. The height of the groove 26b is further preferably sized such that a slight degree of force is required to seat two of the edge portions 40a of the mounting plate member 40 in the groove such that the mounting plate member does not wobble or otherwise "rock" in the groove. Once the mounting plate member 40 is inserted in the groove 26b, the entire motor 36 is supported within the housing half 16b such that no portion of the motor 36 touches the interior wall 30 of the housing half 16b. Accordingly, no other portion of the interior wall 30 of the housing half 16b or any other external component is required to support the motor 36.

To complete assembly of the trimmer apparatus 10, the first housing half 16a is then placed over the second housing half 16b and the two halves secured together via threaded screws which extend through the apertures 24 in the first housing half and into the bores 24 of the bosses 22 of the second housing half. As the first housing half 16a is positioned over the second housing half 16b, the remaining half of the mounting plate 40 is urged into the corresponding groove formed in the first housing half. The motor mounting plate assembly 38, and thus the motor 36, are both held securely within the housing halves 16a and 16b once the two halves are assembled together.

It will be appreciated that the mounting plate assembly 38 of the present invention allows the motor 36 to be supported within the housing halves 16a and 16b without the need for a plurality of internally formed ribs to make abutting contact with any portion of the motor. This significantly simplifies the complexity of manufacture of each of the housing halves 16a and 16b, and thus the overall cost of manufacture of the trimmer apparatus 10.

With further reference to FIGS. 5 and 6, in a preferred embodiment the motor mounting plate 40 includes a plurality of apertures 58 spaced circumferentially about the central aperture 55. While optional, the apertures 58 help to enable the mounting plate 40 to act as a heat-sink to help cool the motor 36 during prolonged operation of the trimmer apparatus 10. The mounting plate 40 and the U-shaped bracket member 42 are each preferably formed of metal to help conduct heat from the motor 36. It will be appreciated, however, that a wide variety of materials could be used for the mounting plate 40 and U-shaped bracket member 42, provided same have generally good rigidity and are thermally conductive.

Referring now to FIG. 6, an alternative preferred embodiment 60 of the motor mounting assembly of the present invention is shown. The motor mounting assembly 60 includes a bushing insert 62 which is adapted to be press-fit into a bore 64 in a boss portion 65 of a fan 66. The bushing insert 62 includes a bore 68 which receives an armature shaft 70 having a smooth outer surface to thus couple the fan 66 securely to the armature shaft.

With reference to FIG. 7, the bushing insert 62 includes a top portion 72 and a main body portion 74. The main body portion 74 is knurled and includes a longitudinally extending slot 76 and a bevelled edge portion 78. The bore 68 further includes a threaded inner wall 80 in which the tops of each of the threads have been removed to form flat portions 82.

With further reference to FIGS. 6 and 7, when the bushing insert 62 is press-fit into the bore 64 of the fan 66, the slot 76 and knurled outer surface of the main body portion 74 cause it to form a tight interference fit with the interior of the bore 64. When the fan 66 and bushing insert 62 are then pressed onto the armature shaft 70 of the motor 36, the threaded inner wall 80 allows a second tight interference fit to be achieved, between the bore 68 of the bushing insert and the smooth exterior surface of the armature shaft 70. The threaded interior wall 80 and flat portions 82 further allow the level of hoop stress in the bushing insert 62 to be reduced. This is due to the combined thread-shearing and insert-expanding action that occurs when the smooth armature shaft 70 is inserted into the bore 68. With a conventional threaded interior where the thread pitch diameter approximates the diameter of the armature shaft 70, the increase in hoop stress could be several orders of magnitude higher than that experienced by the bushing insert 62 having the threaded interior wall 80 shown in FIG. 7. Thus, the bushing insert 62 allows an extremely tight interference fit to be formed between the bushing insert 62 and the smooth armature shaft 70 without the bushing insert experiencing unacceptably high levels of hoop stress once press-fit onto the armature shaft. The bushing insert 62 thus compensates for slight variations in the diameters of the armature shaft 70 and the bore 64 to provide a secure coupling of the fan 66 and the armature shaft 70.

Still another advantage provided by the bushing insert 62 and motor mounting plate assembly 38 is that they absorb impact forces which would normally otherwise be absorbed by the armature of the motor 36 when a "bump-feed" type of feed spool is coupled to the fan 66. As explained briefly herein, with conventional bump-feed spool mechanisms the operator bumps the spool 39 on the ground during operation to cause additional cutting line to be fed out from the spool. While relatively simple in operation, the armature of the motor 36 would normally be forced to absorb the shock of each "bump" every time the operator bumped the trimmer apparatus 10 on the ground to advance a new length of cutting line from the spool 39. By incorporating the bushing insert 62 and the motor mounting plate assembly 38, the "bump" forces experienced each time the operator bumps the spool 39 against the ground is absorbed by the thrust-absorbing portion 59 of the plate member 40 when the top portion 72 of the bushing insert makes contact therewith. Thus, the plate member 40, rather than the armature of the motor 36, absorbs the forces experienced during bump feeding of the cutting line. It will also be appreciated that the motor mounting plate assembly 38 also works to absorb the axial bump forces even when the bushing insert 62 is not incorporated. This is because the raised thrust bearing surface 59 would still absorb the impact from the boss 65 of the fan 66.

While the motor mounting plate assembly 38 has been described in connection with a string trimmer apparatus 10, it will be appreciated that the assembly 38 is applicable, with little or no modification, to virtually any form of small electric tool or appliance which includes an internally mounted electric motor. The teachings of the invention described in connection with the preferred embodiments are further particularly applicable to any form of tool or appliance having an electric motor, where an armature shaft of the motor must absorb not only radial thrust loads, but axial thrust loads as well.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An outdoor power tool for trimming vegetation, comprising:

a first housing section;

a second housing section securable to said first housing section;

each of said first and second housing sections including an interior surface wall;

each of said first and second housing sections including a generally circumferential groove formed therein, each said groove further being positioned such that when said first and second housing sections are secured together said grooves are disposed within a common plane to effectively form a generally circumferential groove extending about substantially an entire length of each said interior surface wall of each of said first and second housing sections;

a motor disposed within said first and second housing sections;

a cutting implement operationally coupled to said motor so as to be drivable rotationally by said motor; and a motor mounting assembly including a plate member fixedly secured to said motor, said plate member being of dimensions enabling said plate member to be inserted at least partially within said grooves within said first and second housing sections such that said plate member is supported at a plurality of circumferential locations about said interior surface wall of each of said first and second housing sections to thereby support said motor fixedly relative to said first and second housing sections without said motor contacting any portion of said interior surface wall of said first housing section or any portion of said interior surface wall of said second housing section.

2. The outdoor power tool of claim 1, wherein said mounting plate assembly further comprises a bracket member fixedly securable to said plate member and to said motor such that said motor is supported fixedly relative to said plate member.

3. The outdoor power tool of claim 2, wherein said bracket member includes an aperture;

wherein said plate member includes an aperture; and said aperture in said bracket member and said aperture in said plate member permitting an armature shaft of said motor to extend through said bracket member and said plate member.

4. The outdoor power tool of claim 1, wherein said circumferential groove in said first housing section is formed by a first shoulder portion protruding outwardly from said interior surface wall of said first housing section about a portion of said interior surface wall; and a plurality of second interior shoulder portions spaced apart from one another and also from said first shoulder portion, an upper edge surface of each one of said interior shoulder portions and an undersurface of said first shoulder portion defining an area representing said circumferential groove into which a portion of said plate member is inserted.

5. A line trimming apparatus for trimming vegetation, comprising:

a flexible cutting line;

a holder for supporting at least a portion of the cutting line;

a motor for rotationally driving the holder and cutting line;

a housing enclosing at least a portion of the motor;

a groove formed on an internal surface of the housing; and a mounting plate assembly adapted to be fixedly connected to a portion of the motor and partially inserted into said groove such that said mounting plate assembly supports said motor within said housing.

6. The apparatus of claim 5, further comprising:

a fan having a bore;

a bushing insert having a bore extending therethrough; and said bushing insert being adapted to be inserted within said bore in said fan to frictionally engage said bore of said fan and further to be forcibly pressed onto an output shaft of said motor to thereby frictionally engage said output shaft, to thereby couple said fan to said output shaft.

7. A line trimming apparatus for trimming vegetation, comprising:

a trimming line;

a motor drivingly connected to the line;

a housing having an interior wall surface, said interior wall surface including a mounting area in the form of a groove formed thereon; and a mounting plate assembly fixedly secured to said motor for mounting said motor within said housing such that said at least a portion of said mounting plate assembly is supported within said groove in said interior wall surface of said housing such that said motor is supported within said housing without the need for direct contact of any portion of said motor with said interior wall surface of said housing.

8. The apparatus of claim 3, wherein said groove in said interior wall surface comprises:

a laterally protruding shoulder portion;

a plurality of laterally protruding, spaced apart interior shoulder portions;

each one of said interior shoulder portions having an upper edge surface and being formed such that said upper edge surfaces are generally aligned within a common plane; and said upper edge surfaces cooperating with an undersurface of said shoulder portion to define said groove therebetween for receiving and supporting said mounting plate assembly once said portion of said mounting plate assembly is inserted within said groove.

9. The apparatus of claim 8, wherein said mounting plate assembly includes a planar plate member secured to said motor; and wherein said planar plate member includes at least one edge portion insertable within said groove such that said planar plate member can be supported fixedly relative to said housing by the engagement of said at least one edge portion within said groove without the need for any portion of said motor contacting said interior wall surface of said housing.

10. The apparatus of claim 7, wherein said mounting plate assembly includes:

a planar plate member; and a bracket member fixedly secured to said planar plate member and also fixedly secured to a portion of said motor so as to space said motor apart from said planar plate member.

11. The apparatus of claim 7, further comprising:

a fan adapted to be driven rotationally by said motor; and a bushing insert fixedly secured to said fan and to an armature shaft of said motor;

said bushing insert including a top portion adapted to abuttingly engage a portion of said mounting plate assembly to absorb axial thrust loads imparted by said fan when said fan is bumped against said mounting plate assembly during operation of said trimming apparatus.

12. An outdoor power tool for trimming vegetation comprising:

a housing having an interior wall, said interior wall effectively having a groove formed circumferentially thereabout;

a motor disposed within said housing;

an implement coupled to an armature shaft of said motor so as to be drivable rotationally by said motor; and a mounting plate assembly fixedly coupled to said motor and having a shape permitting said mounting plate assembly to be supported at a plurality of circumferential positions within said groove to thereby support said motor within said housing without said motor requiring direct contact with any portion of said interior wall of said housing for support.

13. The outdoor power tool of claim 12, wherein said mounting plate assembly comprises a plate member fixedly secured to said motor, said plate member having a portion slidably engageable within said groove to enable said motor to be supported within said housing without having said motor contact any portion of said interior wall of said housing.

14. The outdoor power tool of claim 13, wherein said mounting plate assembly further comprises:

a U-shaped bracket member fixedly secured to said plate member and to said motor for supporting said motor fixedly relative to said plate member; and wherein said plate member comprises a centrally disposed aperture for enabling said armature shaft of said motor to pass therethrough.

15. The outdoor power tool of claim 14, further comprising:

a spool for supporting said implement;

a fan coupled to said spool;

a bushing insert fixedly secured to said fan and to said armature shaft such that rotational movement of said armature shaft causes a corresponding rotational movement of said fan and said spool; and said bushing insert having a top portion and wherein said plate member includes a raised thrust absorbing portion for absorbing axial loads imparted by said top portion of said bushing insert when said spool is bumped against a ground surface during operation of said outdoor power tool.

16. A method for assembling an outdoor power tool, the method comprising:

forming a first housing section having a circumferential groove formed in an interior wall thereof;

forming a second housing section having a circumferential groove formed in an interior wall thereof;

fixedly securing a motor mounting plate to a motor;

inserting a portion of said motor mounting plate into said circumferential groove in said second housing section;

placing said first housing section against said second housing section to cause a portion of said mounting plate to engage within said circumferential groove in said interior wall of said first housing section, to thereby cause said mounting plate to be supported at a plurality of positions by said circumferential grooves, to thereby enable said motor to be supported within said first and second housing sections without said motor contacting any portion of said interior walls of said first and second housing sections; and securing said first housing section to said second housing section.

17. The method of claim 16, further comprising the steps of:

fixedly securing said motor to a bracket member prior to placing said motor within said second housing section; and securing said bracket member fixedly to said motor mounting plate prior to placing at least a portion of said motor mounting plate in said groove in said interior wall of said second housing section.

18. The method of claim 17, further comprising the steps of:

forming an aperture in said motor mounting plate; and forming an aperture in said bracket member, said apertures allowing an armature shaft of said motor to pass through both of said motor mounting plate and said bracket member.

19. The method of claim 16, further comprising the step of forming a raised thrust absorbing portion on said motor mounting plate.

20. The method of claim 16, further comprising the steps of:

securing a bushing insert within a bore of a fan;

securing said bushing insert and said fan to an armature shaft of said motor prior to inserting a portion of said motor mounting plate within said groove in said interior wall of said second housing section.

* * * * *

UNITED STATES PATENT AND TRADEMARK OFFICE
CERTIFICATE OF CORRECTION

PATENT NO. : 5,544,417
DATED : August 13, 1996
INVENTOR(S) : Sheldon Atos et al.

It is certified that error appears in the above-indentified patent and that said Letters Patent is hereby corrected as shown below:

Item [56],
On the Title Page, under "References Cited", "U.S. Patent Documents", insert the following patents:

--3,641,749  2/1972  Dwyer, Jr. et al.
 4,603,478  8/1986  Anderson--.

On the Title Page, under "References Cited", insert the following heading and patent information:

--Foreign Patent Documents
 0 315 603  5/1989  Europe
 0 583 737 A1  2/1994  Europe
 2115665  9/1983  United Kingdom--.

On the Title Page, under "Other Publications", line 1, "Heil" should be --Heli--.

Signed and Sealed this

Eleventh Day of March, 1997

Attest:

BRUCE LEHMAN

*Attesting Officer*      *Commissioner of Patents and Trademarks*